US011518100B2

(12) United States Patent
Lei et al.

(10) Patent No.: US 11,518,100 B2
(45) Date of Patent: Dec. 6, 2022

(54) ADDITIVE MANUFACTURING WITH A POLYGON SCANNER

(71) Applicant: APPLIED MATERIALS, INC., Santa Clara, CA (US)

(72) Inventors: Wei-Sheng Lei, San Jose, CA (US); Mahendran Chidambaram, Saratoga, CA (US); Visweswaren Sivaramakrishnan, Cupertino, CA (US); Kashif Maqsood, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/256,628

(22) PCT Filed: May 9, 2019

(86) PCT No.: PCT/US2019/031534
§ 371 (c)(1),
(2) Date: Dec. 28, 2020

(87) PCT Pub. No.: WO2019/217690
PCT Pub. Date: Nov. 14, 2019

(65) Prior Publication Data
US 2021/0260826 A1 Aug. 26, 2021

Related U.S. Application Data

(60) Provisional application No. 62/669,329, filed on May 9, 2018.

(51) Int. Cl.
| | |
|---|---|
| *B29C 67/00* | (2017.01) |
| *B29C 64/268* | (2017.01) |
| *B33Y 10/00* | (2015.01) |
| *B33Y 30/00* | (2015.01) |
| *B33Y 50/02* | (2015.01) |
| *B23K 26/082* | (2014.01) |

(Continued)

(52) U.S. Cl.
CPC ............ *B29C 64/268* (2017.08); *B22F 10/28* (2021.01); *B22F 10/366* (2021.01); *B22F 12/41* (2021.01);
(Continued)

(58) Field of Classification Search
CPC ... B29C 64/268; B29C 64/153; B29C 64/393; B33Y 10/00; B33Y 30/00; B33Y 50/00;
(Continued)

(56) References Cited

U.S. PATENT DOCUMENTS

| | | | |
|---|---|---|---|
| 4,616,132 A | 10/1986 | Kessler | |
| 4,643,569 A | 2/1987 | Sullivan et al. | |

(Continued)

FOREIGN PATENT DOCUMENTS

| | | |
|---|---|---|
| CN | 102574204 | 7/2012 |
| CN | 104923786 A | 9/2015 |

(Continued)

OTHER PUBLICATIONS

International Search Report and Written Opinion in related International Application No. PCT/US2019/031535, dated Aug. 16, 2019, 9 pages.

(Continued)

*Primary Examiner* — Ryan M Ochylski
(74) *Attorney, Agent, or Firm* — Fish & Richardson P.C.

(57) ABSTRACT

An additive manufacturing apparatus includes a platform, a dispenser configured to deliver a plurality of successive layers of feed material onto the platform, at least one light source configured to generate a first light beam and a second light beam, a polygon mirror scanner, an actuator, and a galvo mirror scanner. The polygon mirror scanner is configured to receive the first light beam and reflect the first light beam towards the platform. Rotation of the first polygon mirror causes the light beam to move in a first direction (Continued)

along a path on a layer of feed material on the platform. The actuator is configured to cause the path to move along a second direction at a non-zero angle relative to the first direction. The galvo mirror scanner system is configured to receive the second light beam and reflect the second light beam toward the platform.

15 Claims, 6 Drawing Sheets

(51) Int. Cl.
  *B23K 26/342* (2014.01)
  *B23K 26/70* (2014.01)
  *B29C 64/153* (2017.01)
  *B29C 64/393* (2017.01)
  *B22F 12/49* (2021.01)
  *B22F 12/41* (2021.01)
  *B22F 10/28* (2021.01)
  *B22F 10/366* (2021.01)
  *B23K 26/06* (2014.01)
  *B28B 1/00* (2006.01)
  *B28B 17/00* (2006.01)

(52) U.S. Cl.
  CPC .......... *B22F 12/49* (2021.01); *B23K 26/0608* (2013.01); *B23K 26/0821* (2015.10); *B23K 26/342* (2015.10); *B23K 26/70* (2015.10); *B28B 1/001* (2013.01); *B28B 17/0081* (2013.01); *B29C 64/153* (2017.08); *B29C 64/393* (2017.08); *B33Y 10/00* (2014.12); *B33Y 30/00* (2014.12); *B33Y 50/02* (2014.12)

(58) Field of Classification Search
  CPC .. B33Y 50/02; B23K 26/0821; B23K 26/342; B23K 26/70; B23K 26/0608; B22F 12/49; B22F 12/41; B22F 10/28; B22F 10/366; B28B 1/001; B28B 17/0081
  See application file for complete search history.

(56) References Cited

U.S. PATENT DOCUMENTS

| | | |
|---|---|---|
| 6,359,255 B1 | 3/2002 | Yamamoto et al. |
| 8,784,720 B2 | 7/2014 | Oberhofer et al. |
| 8,967,990 B2 | 3/2015 | Weidinger et al. |
| 9,073,260 B2 | 7/2015 | El-Siblani et al. |
| 9,073,261 B2 | 7/2015 | El-Siblani et al. |
| 9,073,262 B2 | 7/2015 | El-Siblani et al. |
| 9,079,355 B2 | 7/2015 | El-Siblani et al. |
| 9,415,443 B2 | 8/2016 | Ljungblad et al. |
| 9,435,998 B1 | 9/2016 | Bibas et al. |
| 9,556,525 B2 | 1/2017 | Dierkes et al. |
| 10,730,240 B2 | 8/2020 | Ng et al. |
| 10,940,641 B2 | 3/2021 | Franklin et al. |
| 10,981,323 B2 | 4/2021 | Franklin et al. |
| 11,065,689 B2 | 7/2021 | Ishikawa et al. |
| 11,135,773 B2 | 10/2021 | Ishikawa et al. |
| 11,225,027 B2 | 1/2022 | Raghavan et al. |
| 11,331,855 B2 | 5/2022 | Yao et al. |
| 2003/0052105 A1 | 3/2003 | Nagano et al. |
| 2006/0215246 A1 | 9/2006 | Kerekes et al. |
| 2010/0187207 A1 | 7/2010 | Lee et al. |
| 2011/0287570 A1 | 11/2011 | Katsura et al. |
| 2013/0001834 A1 | 1/2013 | El-Siblani et al. |
| 2013/0112672 A1 | 5/2013 | Keremes et al. |
| 2013/0189435 A1 | 7/2013 | Mackie et al. |
| 2014/0052288 A1 | 2/2014 | El-Siblani et al. |
| 2014/0198365 A1 | 7/2014 | Li et al. |
| 2014/0263209 A1 | 9/2014 | Burris et al. |
| 2014/0271328 A1 | 9/2014 | Burris et al. |
| 2015/0102531 A1 | 4/2015 | El-Siblani et al. |
| 2015/0283761 A1 | 10/2015 | Maeda et al. |
| 2016/0016255 A1 | 1/2016 | Bruck et al. |
| 2016/0052014 A1 | 2/2016 | Halder et al. |
| 2016/0114432 A1 | 4/2016 | Ferrar et al. |
| 2016/0136730 A1 | 5/2016 | McMurtry et al. |
| 2016/0368054 A1 | 12/2016 | Ng et al. |
| 2017/0021419 A1 | 1/2017 | Ng et al. |
| 2017/0021454 A1 | 1/2017 | Dallarosa et al. |
| 2017/0021455 A1 | 1/2017 | Dallarosa et al. |
| 2017/0036299 A1 | 2/2017 | Goya et al. |
| 2017/0036404 A1 | 2/2017 | Rengers et al. |
| 2017/0144254 A1 | 5/2017 | Buller et al. |
| 2017/0165751 A1 | 6/2017 | Buller et al. |
| 2017/0173736 A1 | 6/2017 | Gray |
| 2017/0173876 A1 | 6/2017 | Lissotschenko |
| 2017/0203363 A1 | 7/2017 | Rowland et al. |
| 2017/0326798 A1 | 11/2017 | Choi et al. |
| 2017/0330370 A1 | 11/2017 | Kim et al. |
| 2018/0085995 A1 | 3/2018 | Davis |
| 2018/0141270 A1 | 5/2018 | Steege |
| 2018/0154443 A1 | 6/2018 | Milshtein et al. |
| 2018/0185963 A1 | 7/2018 | Ostroverkhov et al. |
| 2018/0186073 A1 | 7/2018 | Dial et al. |
| 2018/0186082 A1 | 7/2018 | Randhawa |
| 2018/0193955 A1 | 7/2018 | Karp et al. |
| 2018/0194074 A1 | 7/2018 | Shi et al. |
| 2018/0207750 A1 | 7/2018 | Carter |
| 2018/0229431 A1 | 8/2018 | Amaya et al. |
| 2018/0229444 A1 | 8/2018 | Karp et al. |
| 2018/0250770 A1 | 9/2018 | Graham et al. |
| 2018/0257299 A1 | 9/2018 | Ng et al. |
| 2018/0257300 A1 | 9/2018 | Ng et al. |
| 2018/0257301 A1 | 9/2018 | Ng et al. |
| 2018/0326663 A1 | 11/2018 | Demuth et al. |
| 2018/0333918 A1 | 11/2018 | Sohn et al. |
| 2018/0339450 A1 | 11/2018 | Franklin et al. |
| 2018/0339454 A1 | 11/2018 | Franklin et al. |
| 2018/0369914 A1 | 12/2018 | Ishikawa et al. |
| 2018/0369960 A1 | 12/2018 | Ishikawa et al. |
| 2019/0151944 A1 | 5/2019 | Steffas et al. |
| 2021/0023789 A1 | 1/2021 | Ng et al. |

FOREIGN PATENT DOCUMENTS

| | | |
|---|---|---|
| CN | 105799176 | 7/2016 |
| CN | 105880591 A | 8/2016 |
| CN | 106891001 A | 6/2017 |
| CN | 107850773 | 3/2018 |
| DE | 10 2010 048335 | 4/2012 |
| EP | 2926925 | 10/2015 |
| JP | H01-316415 | 12/1989 |
| JP | H03-32481 | 2/1991 |
| JP | H11-033752 A | 2/1999 |
| JP | 2000-328106 | 11/2000 |
| JP | 2009-006509 | 1/2009 |
| JP | 2011-033752 | 2/2011 |
| JP | 2013-501701 | 1/2013 |
| JP | 2016-522312 | 7/2016 |
| KR | 10-2003-0090042 | 11/2003 |
| KR | 10-2006-0012398 | 2/2006 |
| KR | 10-1612254 | 4/2016 |
| KR | 10-2016-0057568 | 5/2016 |
| KR | 10-2016-0109866 | 9/2016 |
| KR | 10-1682087 | 12/2016 |
| WO | WO 2009/026520 | 2/2009 |
| WO | WO 2016/026706 | 2/2016 |
| WO | WO 2016/051163 | 4/2016 |
| WO | WO 2016/060315 | 4/2016 |
| WO | WO 2016/068598 | 5/2016 |
| WO | WO 2016/076486 | 5/2016 |
| WO | WO 2016/114531 | 7/2016 |

OTHER PUBLICATIONS

International Search Report and Written Opinion in International Appln. No. PCT/US2019/031534, dated Aug. 16, 2019, 9 pages.
Office Action in Korean Appln. No. 10-2020-7035004, dated Aug. 6, 2021, 11 pages (with English translation).

(56) References Cited

OTHER PUBLICATIONS

Patwa et al., "Novel Multi-Beam Processing System for Laser Additive Manufacturing," Laser Chirp, Sep. 15, 2014, 6 pages.
Office Action in Japanese Appln. No. 2020-561884, dated Dec. 7, 2021, 8 pages (with English translation).
Office Action in Chinese Appln. No. 201980042110.5, dated Dec. 29, 2021, 15 pages (with English translation).
Office Action in Japanese Appln. No. 2020-561884, dated May 10, 2022, 6 pages (with English translation).

ADDITIVE MANUFACTURING WITH A POLYGON SCANNER

CROSS-REFERENCE TO RELATED APPLICATIONS

This application is a U.S. National Stage Application under 35 USC § 371 and claims the benefit of International Patent Application No. PCT/US2019/031534 filed May 9, 2019, which claims priority to U.S. Provisional Application Ser. No. 62/669,329, filed May 9, 2018. Both of the foregoing applications are hereby incorporated by reference in their entirety.

TECHNICAL FIELD

This disclosure relates to an energy delivery system for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, an additive manufacturing apparatus includes a platform, a dispenser configured to deliver a plurality of successive layers of feed material onto the platform, at least one light source configured to generate a first light beam and a second light beam, a polygon mirror scanner, an actuator, and a galvo mirror scanner. The polygon mirror scanner is configured to receive the first light beam and reflect the first light beam towards the platform. Rotation of the first polygon mirror causes the light beam to move in a first direction along a path on a layer of feed material on the platform. The actuator is configured to cause the path to move along a second direction at a non-zero angle relative to the first direction. The galvo mirror scanner system is configured to receive the second light beam and reflect the second light beam toward the platform.

Implementations may include one or more of the following features.

The actuator may include a linear actuator configured to move the polygon mirror scanner along the second direction. The polygon mirror scanner may be configured to rotate about an axis parallel to the second direction. The actuator may include a rotary actuator configured to rotate a mirror about an axis parallel to the first direction. The polygon mirror scanner may be configured to rotate about an axis perpendicular to a top surface of the platform. Facets of the polygonal mirror of the polygon mirror scanner may be parallel or oblique relative to an axis of rotation of the polygonal mirror.

The polygon mirror scanner and galvo mirror scanner system are positioned such that both simultaneously have an uninterrupted field of view of a portion of the platform, e.g., an uninterrupted field of view of substantially all of a build area of the platform. A scan field of the polygon mirror scanner may fit within a scan field of the galvo mirror scanner system. The galvo mirror scanner system may be positioned below the polygon mirror scanner, and the first light beam may travel without reflection from above the galvo mirror scanner system to the platen. The galvo mirror scanner system may be positioned above the polygon mirror scanner, and the first light beam may be reflected between the polygon mirror scanner and the platen.

The one or more light sources may include separate light sources for the first light beam and second light beam. The one or more light sources may include a common source and a beam splitter to generate the first light beam and second light beam.

A controller may be configured to cause the light source and polygon mirror scanner to cause the first light beam to apply sufficient heat to raise a temperature of the feed material from a first temperature to a second temperature that is below a third temperature(TF) at which the feed material fuses. The controller may be configured to cause the light source and galvo mirror scanner system to cause the second light beam to apply sufficient heat to the feed material while the temperature of the feed material has been raised by the first light beam to further raise the temperature of the feed material above the third temperature.

A controller may be configured to cause the light source and galvo mirror scanner system to cause the second light beam to apply sufficient heat to the feed material to further raise a temperature of the feed material above a temperature (TF) at which the feed material fuses. The controller may be configured to cause the light source and polygon mirror scanner to cause the first light beam to apply heat to the feed material after the feed material has been fused to control a rate of cooling of the feed material.

Particular implementations of the subject matter described in this disclosure can be implemented so as to realize one or more of the following advantages. A light beam can be used for pre-heating or heat-treating of a powder or fused material. Power needed for a laser to fuse the powder can be reduced. Thermal stress can be reduced, which can provide improved part quality.

The details of one or more implementations are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In many additive manufacturing processes, energy is selectively delivered to a layer of feed material dispensed by an additive manufacturing apparatus to fuse the feed material in a pattern, thereby forming a portion of an object. For example, a light beam, e.g., a laser beam, can be reflected off a rotating polygon scanner to drive the light beam in a linear path across the layer of feed material. Relative motion between the light source and the support or a secondary mirror can be used to cause the light beam to perform a raster-scan of the layer.

Additive Manufacturing Apparatus

Figure 1:
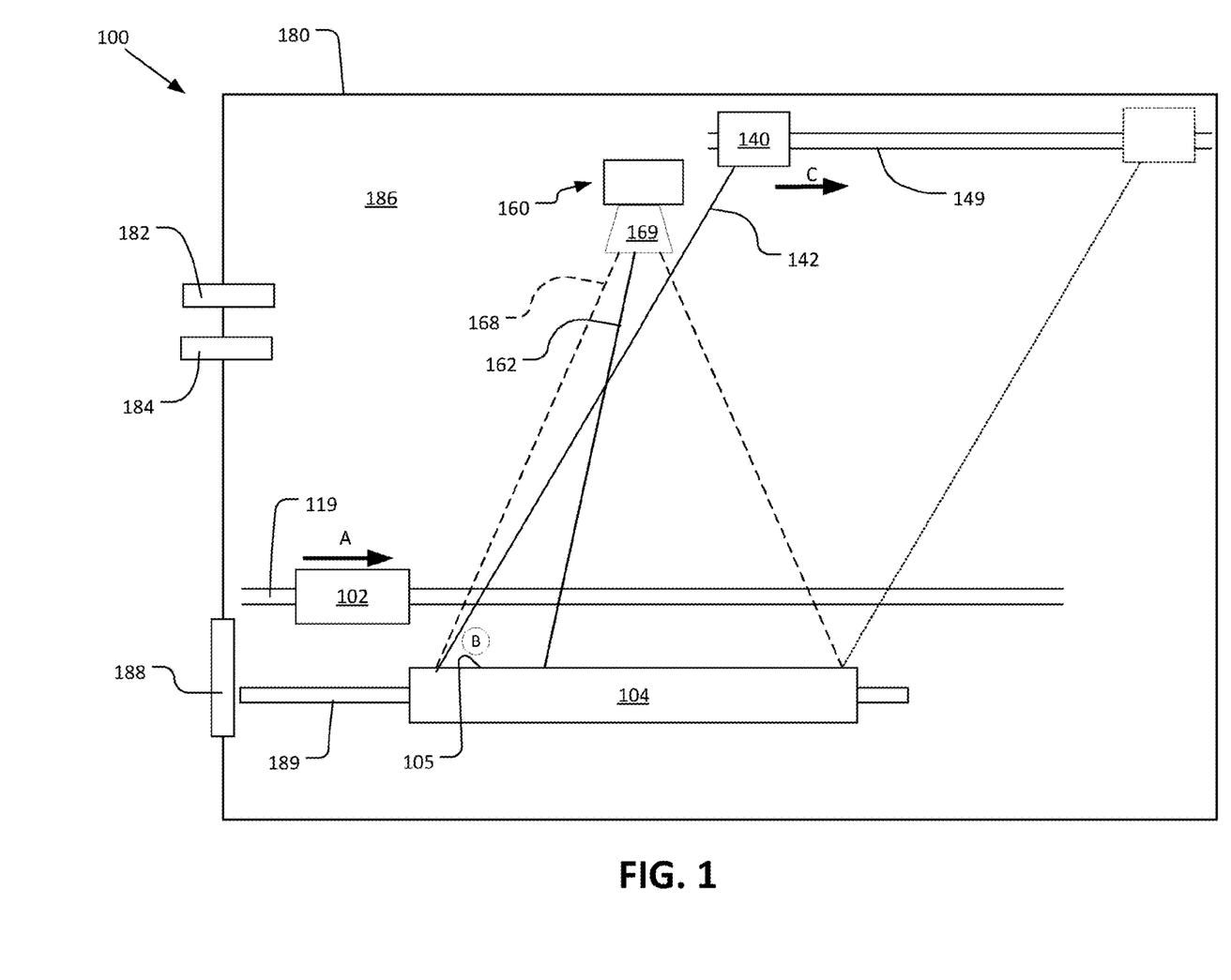
FIG. 1 is a schematic side view of an example additive manufacturing apparatus.

FIG. 1 illustrates a schematic side view of an example additive manufacturing (AM) apparatus 100 that includes a printhead 102 and a build platform 104 (e.g., a build stage). The printhead 102 dispenses layers of one or more powders 106 (FIG. 2) on a top surface 105 of the platform 104. By repeatedly dispensing and fusing layers of powder, the apparatus 100 can form a part on the platform.

The printhead 102 and a build platform 104 can both be enclosed in a housing 180 that forms a sealed chamber 186, e.g., a vacuum chamber, that provides a controlled operating environment. The chamber 186 can include an inlet 182 coupled to a gas source and an outlet 184 coupled to an exhaust system, e.g., a pump. The gas source can provide an inert gas, e.g. Ar, or a gas that is non-reactive at the temperatures reached by the powder for melting or sintering, e.g., $N_2$. This permits the pressure and oxygen content of the interior of the housing 180 to be controlled. For example, oxygen gas can be maintained at a partial pressure below 0.01 atmospheres.

The chamber 186 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Ti powder particles. A load lock chamber accessible through a valve 188, e.g., a slit valve, can be used to separate the chamber 186 from the external environment while permitting parts, e.g., the build platform with the fabricated object, to be removed from the chamber. For example, the build platform 104 can be movable on a track 189, e.g., a rail.

Figure 2A:
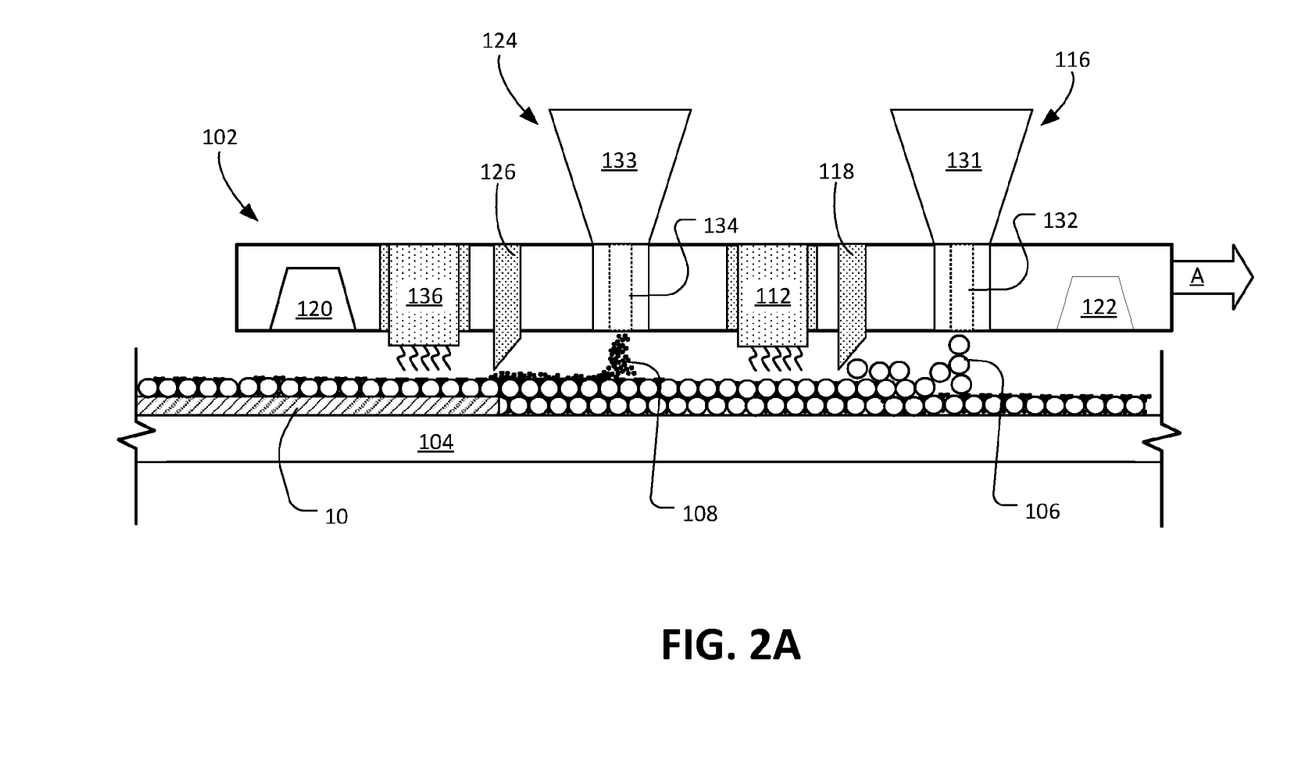
FIGS. 2A and 2B are schematic side and top views of a printhead from the additive manufacturing apparatus.
Figure 2B:
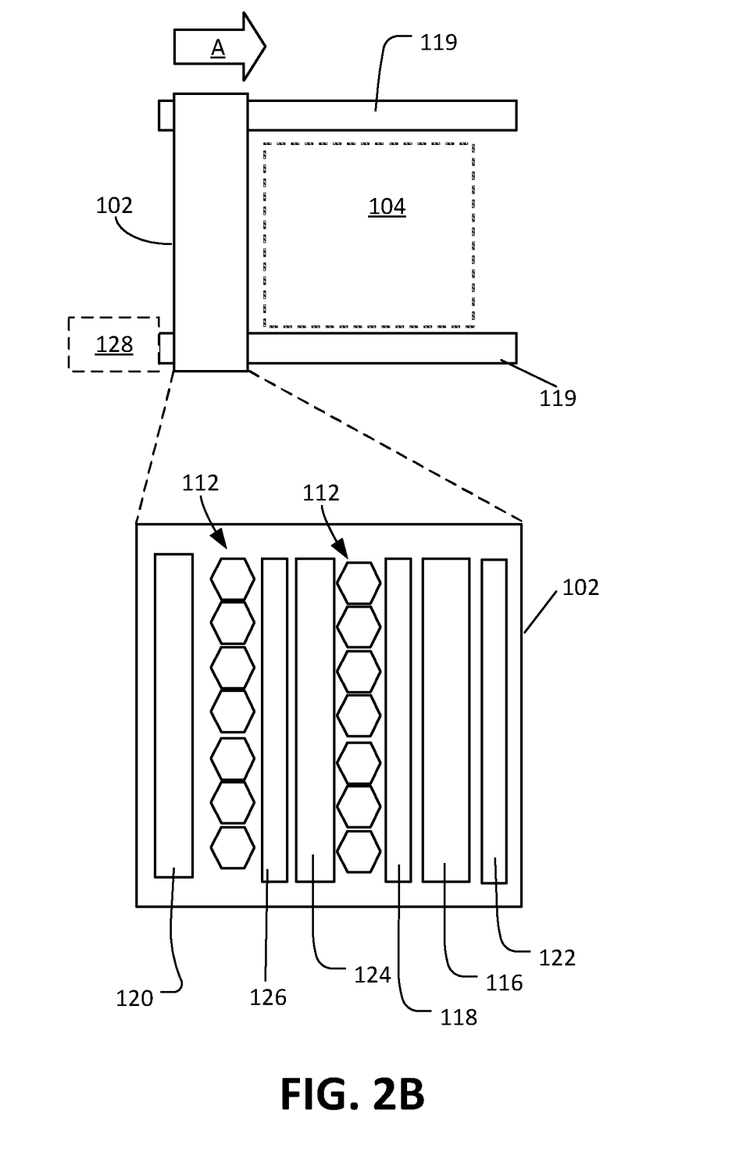

Referring to FIGS. 1 and 2B, the printhead 102 is configured to traverse the platform 104 (shown by arrow A). For example, the apparatus 100 can include a support, e.g., a linear rail or pair of linear rails 119, along which the printhead can be moved by a linear actuator and/or motor. This permits the printhead 102 to move across the platform 104 along a first horizontal axis. In some implementations, the printhead 102 can move along a second horizontal axis perpendicular to the first axis.

The printhead 102 can also be movable along a vertical axis. In particular, after each layer is fused, the printhead 102 can be lifted by an amount equal to the thickness of the deposited layer of powder. This can maintain a constant height difference between the dispenser on the printhead and the top of the powder on the platform 104. A drive mechanism, e.g., a piston or linear actuator, can be connected to the printhead or support holding the printhead to control the height of the printhead. Alternatively, the printhead 102 can be held in a fixed vertical position, and the platform 104 can be lowered after each layer is deposited.

Referring to FIGS. 2A and 2B, the printhead 102 includes at least a first dispensing system 116 to selectively dispense powder 106 on the build platform 104. In the implementation illustrated in FIG. 2A, the first dispensing system 116 includes a hopper 131 to receive the powder 106. The powder 106 can travel through a channel 132 having a controllable aperture, e.g., a valve that controls whether the powder is dispensed onto the platform 104.

Optionally, the printhead 102 can include a heater 112 to raise the temperature of the deposited powder. The heat source 112 can heat the deposited powder to a temperature that is below its sintering or melting temperature. The heat source 112 can be, for example, a heat lamp array. The heat source 112 can be located, relative to the forward moving direction of the printhead 102, behind the first dispensing system 116. As the printhead 102 moves in the forward direction, the heat source 112 moves across the area where the first dispensing system 116 was previously located.

Optionally, the printhead 102 can also include a first spreader 118, e.g., a roller or blade, that cooperates with the first dispensing system 116 to compact and spread powder dispensed by the dispensing system 116. The spreader 118 can provide the layer with a substantially uniform thickness. In some cases, the first spreader 118 can press on the layer of powder to compact the powder.

The printhead 102 can also optionally include a first sensing system 120 and/or a second sensing system 122 to detect properties of the layer before and/or after powder has been dispensed by the dispensing system 116.

In some implementations, the printhead 102 includes a second dispensing system 124 to dispense a second powder 108. The second dispensing system 124, if present, can be constructed similarly with a hopper 133 and channel 134. A second spreader 126 can operate with the second dispensing system 124 to spread and compact the second powder 108. A second heat source 136 can be located, relative to the forward moving direction of the printhead 102, behind the second dispensing system 124.

The first powder particles 106 can have a larger mean diameter than the second powder particles 108, e.g., by a factor of two or more. When the second powder particles 108 are dispensed on a layer of the first powder particles 106, the second powder particles 108 infiltrate the layer of first powder particles 106 to fill voids between the first powder particles 106. The second powder particles 108, being smaller than the first powder particles 106, can achieve a higher resolution, higher pre-sintering density, and/or a higher compaction rate.

Alternatively or in addition, if the apparatus 100 includes two types of powders, the first powder particles 106 can have a different sintering temperature than the second powder particles. For example, the first powder can have a lower sintering temperature than the second powder. In such implementations, an energy source can be used to heat the entire layer of powder to a temperature such that the first particles fuse but the second powder does not fuse.

In implementations when multiple types of powders are used, the first and second dispensing systems 116, 124 can deliver the first and the second powder particles 106, 108 each into different selected areas, depending on the resolution requirement of the portion of the object to be formed.

Examples of metallic particles include metals, alloys and intermetallic alloys. Examples of materials for the metallic particles include titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

The processing conditions for additive manufacturing of metals and ceramics are significantly different than those for plastics. For example, in general, metals and ceramics require significantly higher processing temperatures. Thus, 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

Returning to FIG. 1, the apparatus 100 also includes a first energy delivery system 140 to selectively add energy to the layer of powder on the build platform 104. The first energy delivery system 140 can be used for fusing of the layer of powder on the platform 104, for pre-heating the layer of powder, and/or for heat-treating the layer of powder.

The first energy delivery system 140 can generate a light beam 142, and includes a reflector assembly that redirects the light beam 142 toward the uppermost layer of powder on the platform 104. Example implementations of the energy delivery system 140 are described in greater detail later within this disclosure. The reflector assembly is able to sweep the light beam 142 along a path 158 (see FIG. 3C), e.g., a linear path, on the uppermost layer. Each sweep can be a linear path on the layer of powder along a direction B. The direction B can be perpendicular to the direction A of travel of the dispenser 102 (e.g., into or out of the page shown in FIG. 1), or parallel to the direction A of travel of the dispenser 102.

As the light beam 142 sweeps along the path, the light beam 142 can be modulated, e.g., by causing the light source 140 to turn the light beam 142 on and off, in order to deliver energy to selected regions of the layers of the powder 106 and fuse the material in the selected regions to form the object in accordance to a desired pattern.

Figures 3A, 3B, 3C:
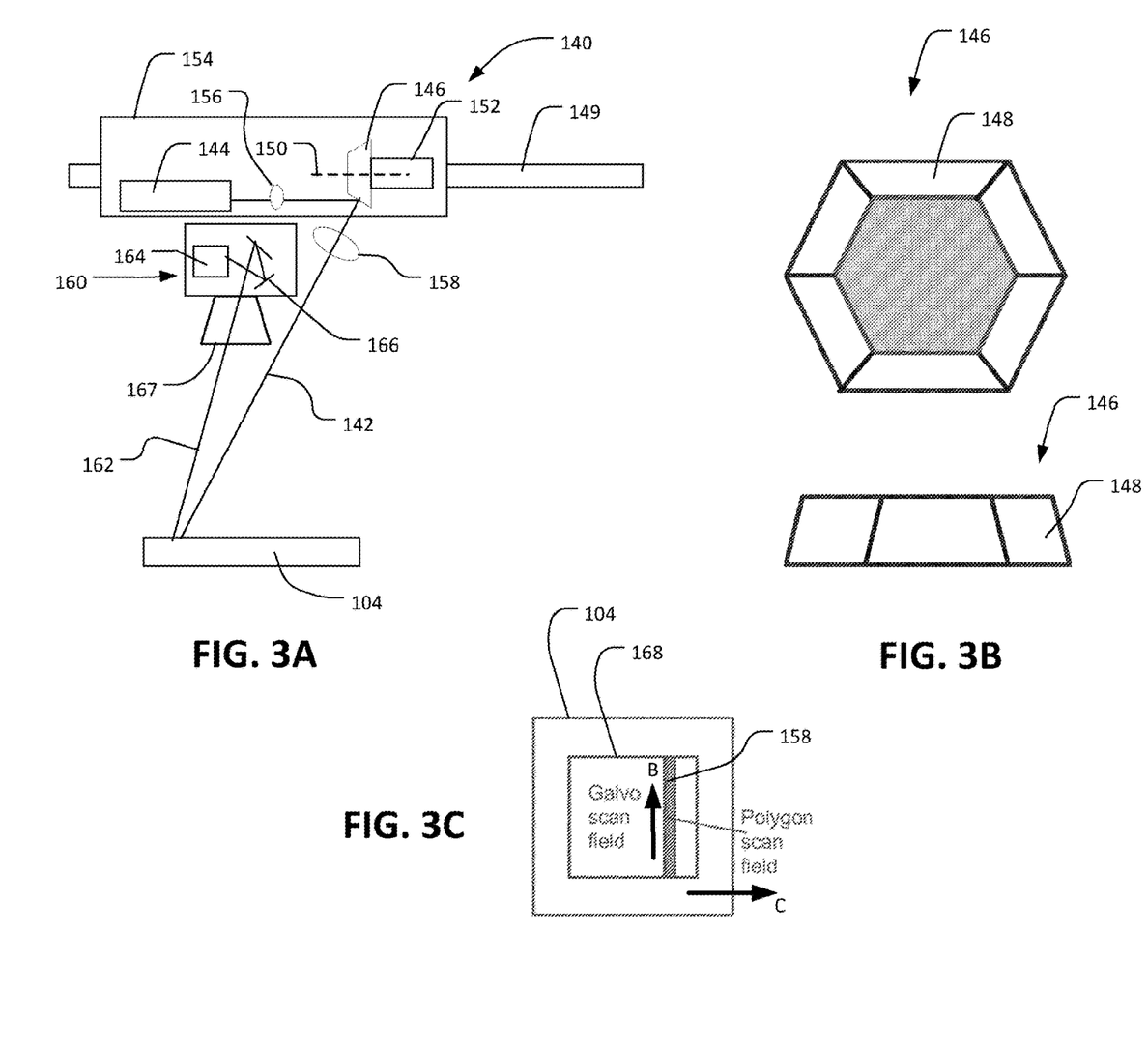
FIG. 3A is a schematic side view of a portion of an example additive manufacturing apparatus.
FIG. 3B includes schematic top and side views of a polygon mirror.
FIG. 3C is a schematic top view of regions scanned by energy delivery systems.

Referring to FIG. 3A, the first energy delivery system 140 includes a light source 144, e.g., a laser, to generate the light beam 142, e.g., the laser beam. The light source can be a light-emitting diode, e.g., a 400-450 nm blue light emitting diode, a laser, e.g., a 500-540 nm second harmonic laser, or another appropriate light source.

A polygonal beam scanner 146 is positioned in the path of the beam to reflect the light beam 142 toward the platform 104. The polygonal beam scanner 146 includes a plurality of reflective facets 148, e.g., in the form of a regular polygon. The polygonal beam scanner 146 can be rotatable about an axis 150 by a rotary actuator 152. The facets 148 can be parallel to the axis of rotation 150, or be oblique (e.g., as shown in FIG. 3A), relative to the axis of rotation 150. Rotation of the polygon beam scanner 146 will cause each facet 148 to move so as to cause the light beam 142 to sweep along the path 158 (see FIG. 3C) on the platform 104. The axis of rotation 150 can be perpendicular to the direction B of travel of the light beam along the path.

At least the polygonal beam scanner 146 is movable along a direction C that is at a non-zero angle, e.g., perpendicular, to the direction of the direction B of travel of the light beam across the platform 104. Thus, as the polygonal beam scanner 146 moves, the region scanned by the light beam 142 will also move across the platform 104 and layer of powder. For example, referring to FIG. 1, the polygonal beam scanner 146 can start in a first position in which the path 158 is near one edge of the platform, and move to a second position (shown in phantom) in which the path 158 is near an opposite edge of the platform.

For example, as shown in FIG. 1, the apparatus 100 can include a support, e.g., a linear rail or pair of linear rails 119, along which the polygonal beam scanner 146 can be moved by a linear actuator and/or motor. In conjunction with relative motion of the polygonal beam scanner 146 and the platform 104, a sequence of sweeps along the path by the light beam 142 can create a raster scan of the light beam 142 across the uppermost layer 116. The direction C can be parallel to the axis of rotation 150.

The polygonal beam scanner 146 can be held by a housing 154 which is movable along the support 149. The light source 144 can also be held by and move with the housing 154. Alternatively, the light source 144 could be stationary, and the light could be delivered to the polygonal beam scanner by a flexible optical fiber. One end of the flexible optical fiber would be movable and secured in a fixed position relative to the polygonal beam scanner 146.

Optionally, the light beam 142 can pass through one or more focusing lenses 156. A focusing lens 156 can be positioned before and/or after the polygonal beam scanner 146.

Returning to FIG. 1, in some implementations, the apparatus 100 also includes a second energy delivery system 160 to selectively add energy to the layer of powder on the build platform 104. The second energy delivery system 160 can generate a second light beam 162, and can include a second reflector assembly that redirects the second light beam 162 toward the uppermost layer of powder on the platform 104.

Referring to FIG. 3A, the second energy delivery system 160 can include a second light source 164, e.g., a second laser 164, to generate the second light beam 162. The second light source can be relatively high power, e.g., 1-10 kW. The second light beam 162 can be scanned across the build area on the platform 104 by a pair of galvo mirror scanners 166 that can provide motion of the light beam 162 along two perpendicular axes. A scan lens 167 can be used to focus and direct the second light beam 162.

Referring to FIGS. 1 and 3C, the scan field 168 of the second energy delivery system 160, e.g., the area addressable by the pair of galvo mirror scanners 166, can span substantially all of the build area on the platform 104. Alternatively, the area addressable by the pair of galvo mirror scanners 166 can be a portion of the build area, and the entire assembly of first energy delivery system 140 and second energy delivery system 160 can be movable so to shift the field scan field across the platform 104. Due to the pair of galvo mirror scanners 166, the light beam 162 can traverse the layer of powder in an arbitrary path, e.g., unlike the first energy delivery system 140, the light beam is not constrained to move along a liner path or a raster scan.

In some implementations, the printhead 102, first powder delivery system 140 and the second energy system 160 are mechanically coupled to the same vertical actuator such that all of them are movable up or down together. This permits the dispenser, first light source and second light source to maintain a constant distance from the uppermost layer of powder on a layer-by-layer basis.

The polygonal mirror scanner 146 can be positioned vertically above the second energy delivery system 160. This permits the second energy delivery system 160 an unobstructed view of the scan field 168.

In some implementation, the first energy delivery system 140 is used for pre-heating or heat treatment, whereas the second energy delivery system 160 is used to fuse the powder. In the case of pre-heating, the first light beam 142 raises the temperature of the powder from an initial temperature to an elevated temperature that is still below the temperature at which the powder melts or fuses. The second light beam 162 then scans the layer of powder and selectively raises the temperature of the powder to a temperature sufficient for the powder to melt or fuse. In the case of heating-treatment, the first light beam 142 delivers energy so as to control the rate of cool down of the material.

Figure 4:
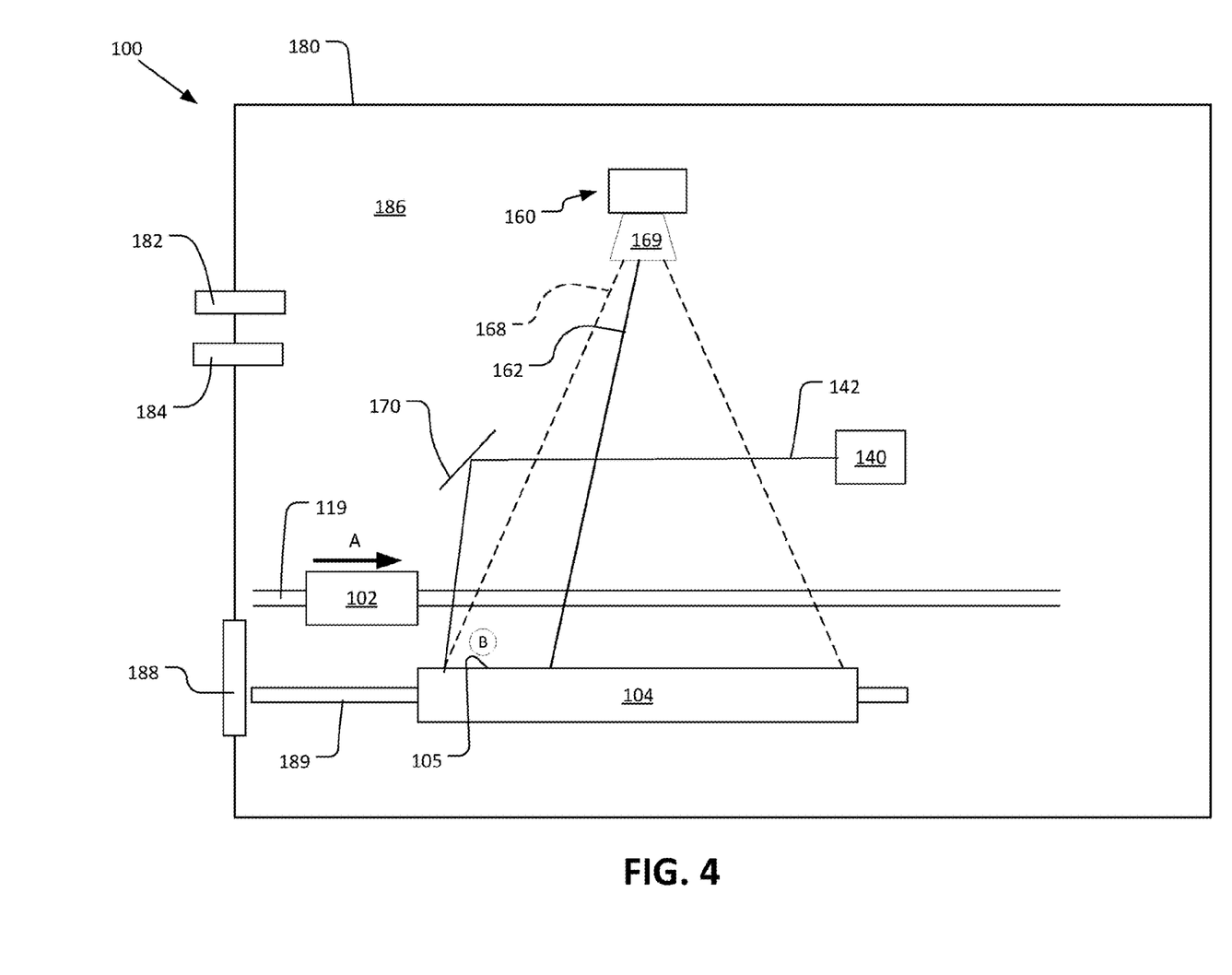
FIG. 4 is a schematic side view of another example additive manufacturing apparatus.
Figure 5:
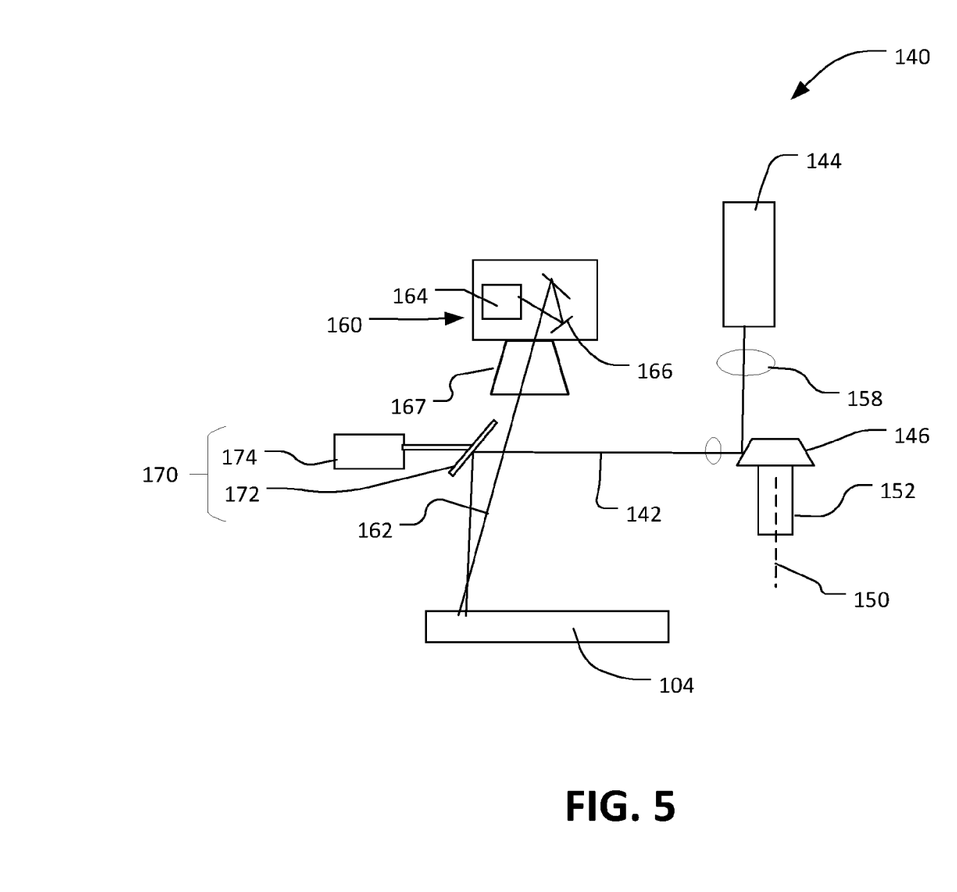
FIG. 5 is a schematic side view of a portion of the another example additive manufacturing apparatus.

Referring to FIGS. 4-5, the apparatus 100 is similar to the apparatus described with reference to FIGS. 1-3C, but second energy delivery system includes a galvo mirror 170 to deflect the light beam 142 so as to scan the path 168 across the platform 104, rather than moving the polygon mirror scanner. In this implementation, the axis of rotation 150 can be vertical, e.g., perpendicular to the top surface of the platform 104. The mirror 172 of the galvo mirror scanner 170 can be driven by an actuator 174 to rotate about an axis that is parallel to the top surface of the platform 104 and parallel to the path 168. Thus, the position of the path 168 along the direction C is controllable by the angle of the mirror 172.

A controller 128 controls the operations of the apparatus 100, including the operations of the printhead 102 and its subsystems such as the dispensing system 116 and the heat source 112, the first energy delivery system 140, and the second energy delivery system 160. The controller 128 can also receive signals from, for example, user input on a user interface of the apparatus or sensing signals from sensors of the apparatus 100. The controller 128 can operate the dispensing system 116 to dispense the powder 106 and can operate the first energy delivery system 140 and the second energy delivery system 160 to heat and fuse the powder 106 to form a workpiece 10 that becomes the object to be formed.

The controller 128 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 128 can generate instructions usable by each of the systems operable with the controller 128, for example, to dispense the powder 106, to fuse the powder 106, to move various systems of the apparatus 100, and to sense properties of the systems, powder, and/or the workpiece 10. In some implementations, the controller 128 can control the first and second dispensing systems 116, 124 to selectively deliver the first and the second powder particles 106, 108 to different regions.

The controller 128, for example, can transmit control signals to drive mechanisms that move various components of the apparatus. In some implementations, the drive mechanisms can cause translation and/or rotation of these different systems, including dispensers, rollers, support plates, energy sources, heat sources, sensing systems, sensors, dispenser assemblies, dispensers, and other components of the apparatus 100. Each of the drive mechanisms can include one or more actuators, linkages, and other mechanical or electromechanical parts to enable movement of the components of the apparatus.

For a controller to be configured to perform particular operations or actions means that the controller has it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

CONCLUSION

The controller and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made. For example:

Other techniques can be used for dispensing the powder. For example, powder could be dispensed in a carrier fluid, e.g., a quickly evaporating liquid such as Isopropyl Alcohol (IPA), ethanol, or N-Methyl-2-pyrrolidone (NMP), and/or ejected from a piezoelectric printhead. Alternatively, the powder could be pushed by a blade from a powder reservoir adjacent the build platform.

For some powders, an electron beam could be used instead of a laser beam to fuse the powder. So the second energy delivery system could include an electron beam source and electron beam scanner rather than a light source and pair of galvo mirror scanners.

The various supports for the components can be implemented as a gantry supported on opposite ends (e.g., on both sides of the platform 104 as shown in FIG. 2B) or a cantilever assembly (e.g., supported on just one side of the platform 104).

Accordingly, other implementations are within the scope of the claims.

What is claimed is:

1. An additive manufacturing apparatus comprising:
a platform;
a dispenser configured to deliver a plurality of successive layers of feed material onto the platform;
at least one light source configured to generate a first light beam and a second light beam;
a polygon mirror scanner configured to receive the first light beam and reflect the first light beam towards the platform, wherein rotation of a polygonal mirror of the polygon mirror scanner causes the first light beam to move in a first direction along a path on a layer of feed material on the platform;
an actuator to move the polygon mirror scanner along a second direction to cause the path to move along the second direction at a non-zero angle relative to the first direction; and
a galvo mirror scanner system configured to receive the second light beam and reflect the second light beam toward the platform, wherein the galvo mirror scanner system has a first scan field that spans at least a portion of a build area on the platform, wherein the polygon mirror scanner has a second scan field that fits within the first scan field of the galvo mirror scanner system, and wherein the galvo mirror scanner system and the polygon mirror scanner and are positioned such that both simultaneously have an uninterrupted field of view of the first and second scan fields respectively.

2. The apparatus of claim 1, wherein the actuator comprises a linear actuator.

3. The apparatus of claim 2, wherein the polygonal mirror is configured to rotate about an axis parallel to the second direction.

4. The apparatus of claim 1, comprising a rotatable mirror and wherein the actuator comprises a rotary actuator configured to rotate the rotatable mirror about an axis parallel to the first direction.

5. The apparatus of claim 4, wherein the polygonal mirror is configured to rotate about an axis perpendicular to a top surface of the platform.

6. The apparatus of claim 1, wherein facets of the polygonal mirror of the polygon mirror scanner are oblique relative to an axis of rotation of the polygonal mirror.

7. The apparatus of claim 1, wherein facets of the polygonal mirror of the polygon mirror scanner are parallel relative to an axis of rotation of the polygonal mirror.

8. The apparatus of claim 1, wherein the polygon mirror scanner and galvo mirror scanner system are positioned such that both simultaneously have an uninterrupted field of view of substantially all of a build area of the platform.

9. The apparatus of claim 1, wherein a scan field of the polygon mirror scanner fits within a scan field of the galvo mirror scanner system.

10. The apparatus of claim 1, wherein the galvo mirror scanner system is positioned below the polygon mirror scanner, and the first light beam travels without reflection from above the galvo mirror scanner system to the platform.

11. The apparatus of claim 1, wherein the galvo mirror scanner system is positioned above the polygon mirror scanner, and the first light beam is reflected between the polygon mirror scanner and the platform.

12. The apparatus of claim 1, comprising a controller configured to cause the light source and polygon mirror scanner to cause the first light beam to apply sufficient heat to raise a temperature of the feed material from a first temperature to a second temperature that is below a third temperature(TF) at which the feed material fuses.

13. The apparatus of claim 12, wherein the controller is configured to cause the light source and galvo mirror scanner system to cause the second light beam to apply sufficient heat to the feed material while the temperature of the feed material has been raised by the first light beam to further raise the temperature of the feed material above the third temperature.

14. The apparatus of claim 1, comprising a controller configured to cause the light source and galvo mirror scanner system to cause the second light beam to apply sufficient heat to the feed material to further raise a temperature of the feed material above a temperature (TF) at which the feed material fuses.

15. The apparatus of claim 14, wherein the controller is configured to cause the light source and polygon mirror scanner to cause the first light beam to apply heat to the feed material after the feed material has been fused to control a rate of cooling of the feed material.

* * * * *